United States Patent [19]
Stirling et al.

[11] Patent Number: 4,959,525
[45] Date of Patent: Sep. 25, 1990

[54] APPARATUS FOR HEATING AN ELECTRICALLY CONDUCTIVE FLOWABLE MATERIAL FLOWING THROUGH A PIPELINE

[75] Inventors: Robert Stirling, Merseyside; Steven A. Coombes, Crawley, both of England

[73] Assignees: Electricity Association Services Limited; APV U.K. Limited, both of United Kingdom; part interest to each

[21] Appl. No.: 307,394

[22] Filed: Feb. 7, 1989

[30] Foreign Application Priority Data

Feb. 9, 1988 [GB] United Kingdom ................ 8802957

[51] Int. Cl.[5] .......................... H05B 3/60; H05B 1/02; A23L 3/32; F24H 1/10
[52] U.S. Cl. .................... 219/291; 99/451; 219/284; 219/288; 219/295; 338/80; 426/247
[58] Field of Search ............... 219/284–295; 338/80, 86; 99/451; 426/244, 247

[56] References Cited

U.S. PATENT DOCUMENTS

| | | | |
|---|---|---|---|
| 918,531 | 4/1909 | Goucher | 99/451 X |
| 1,147,558 | 7/1915 | Shelmerdine | 99/451 X |
| 1,398,630 | 11/1921 | Dawe | 219/291 X |
| 1,546,061 | 7/1925 | Drefahl | 219/285 X |
| 2,319,477 | 5/1943 | Rush | 219/295 |
| 3,354,256 | 11/1967 | Vaughan . | |
| 3,590,752 | 7/1971 | Bilynsky | 99/334 |
| 3,714,392 | 1/1973 | Katzman et al. | 219/288 X |
| 4,417,132 | 11/1983 | Simpson | 219/289 X |

FOREIGN PATENT DOCUMENTS

| | | |
|---|---|---|
| 0032841 | 7/1981 | European Pat. Off. . |
| 0031482 | 8/1981 | European Pat. Off. . |
| 0178981 | 4/1986 | European Pat. Off. . |
| 460315 | 10/1913 | France . |
| 2054750 | 7/1971 | France . |
| 596526 | 3/1978 | Switzerland . |
| 260030 | 1/1975 | U.S.S.R. ............ 219/285 |

*Primary Examiner*—Anthony Bartis
*Attorney, Agent, or Firm*—Kinney & Lange

[57] ABSTRACT

A heating apparatus for heating an electrically conductive flowable medium includes a pipe having a conductivity no greater than that of the medium and a pair of electrodes projecting in a cantilever fashion into the pipe at spaced locations therealong and each having a noble metal plated surface exposed to the flowable medium. Each electrode is sealed to the wall of the pipe with a flat-faced aseptic seal formed between a flat end face of the electrode and a cooperating flat face on the pipe wall. The electrodes may be hollow, fluid cooled and have a rounded free end made of an electrically non-conducting material on which is mounted a temperature or pressure sensor. The exposed electrode surface may be partially coated with an electrically insulative material to confine heating current flow to a particular surface portion of the electrode.

9 Claims, 3 Drawing Sheets

APPARATUS FOR HEATING AN ELECTRICALLY CONDUCTIVE FLOWABLE MATERIAL FLOWING THROUGH A PIPELINE

This invention relates to heating apparatus, and in particular to heating apparatus for heating an electrically conductive flowable medium.

Such apparatus is disclosed in GB-A-2067390, this known apparatus comprising a pipe through which, in use, a medium to be heated flows, the pipe having an electrical conductivity no greater than that of the medium; at least two heating electrodes arranged at spaced locations along the pipe and each having a surface exposed to the medium flowing in the pipe; and supply means for applying and alternating electrical supply across the heating electrodes such that an alternating current flows in the medium between the heating electrodes and heats the medium.

In this known apparatus each heating electrode is cylindrical and is arranged with its axis transverse to the direction of flow of the medium in the pipe, and with a portion at each end extending into the wall of the pipe, whereby substantially all of the current flows between predetermined portions only of the surfaces of the heating electrodes exposed to the medium. Each heating electrode thus extends completely across the pipe, and is supported by the pipe wall in the manner of a simply supported beam, the heating electrode passing into the pipe wall at two positions each of which requires sealing to prevent loss of the medium being heated, and each of which presents difficulties arising from different coefficients of thermal expansion of the pipe and heating electrode.

According to this invention, in an apparatus as set out above each heating electrode is cylindrical and is arranged in the pipe with its axis transverse to the direction of flow of the medium in the pipe, and has only one end secured to the wall of the pipe whereby the heating electrode is supported by the wall of the pipe in the manner of a cantilever beam, connection to the heating electrode being made through the wall of the pipe.

The apparatus of this invention has the advantage over the known apparatus that fewer seals between the pipe and the heating electrodes are required, and flat faced aseptic type seals can be used. Further, there is only one discontinuity of the pipe wall caused by each heating electrode. This is important when the medium being heated is, for example, a foodstuff, since there are fewer crevices and the like which can harbour bacteria. Further, since there is only one junction between the pipe and each heating electrode it is easy to allow for differential expansion between the pipe and electrode.

Preferably the free end of each heating electrode within the pipe is rounded to obtain a smooth medium flow thereover and to minimise heating current concentration.

The whole heating electrode surface exposed to the medium in the pipe can be plated with a noble metal, for example platinum - iridium. However, if it is desired to confine the heating current to a particular surface portion of the heating electrode, the remainder of the surface can be given a coating of electrically insulating material, for example, a plastic material, or, for example the heating electrode can have a free end portion made of electrically non-conductive or semi-conducting material.

Preferably the heating electrode is hollow and means is provided to circulate air, or another fluid, in the heating electrode to effect cooling thereof. Cooling of the electrode, and preferably also of the wall of the pipe, is desirable in order to prevent deterioriation of the medium being heated and possible build-up of overheated medium in the apparatus.

A pressure transducer can be mounted on the heating electrode, for example at the free end thereof, to measure the pressure in the medium being heated and thus detect any blockages that occur in the pipe. If each heating electrode in the apparatus has such a pressure transducer then any blockage can be rapidly located, and continuous information for mass flow metering can be obtained.

A temperature sensor in the form of, for example, a thermocouple can be mounted on the heating electrode whereby the temperature of the medium being heated can be monitored with the information obtained being used to give a warning of any blockages that might occur in the pipe.

This invention will now be described by way of example with reference to the drawings, in which.

The apparatus to be described is of the type described in GB-A-2067390 to which reference can be had for complete details of the energisation and operation of such apparatus.

Figure 1:
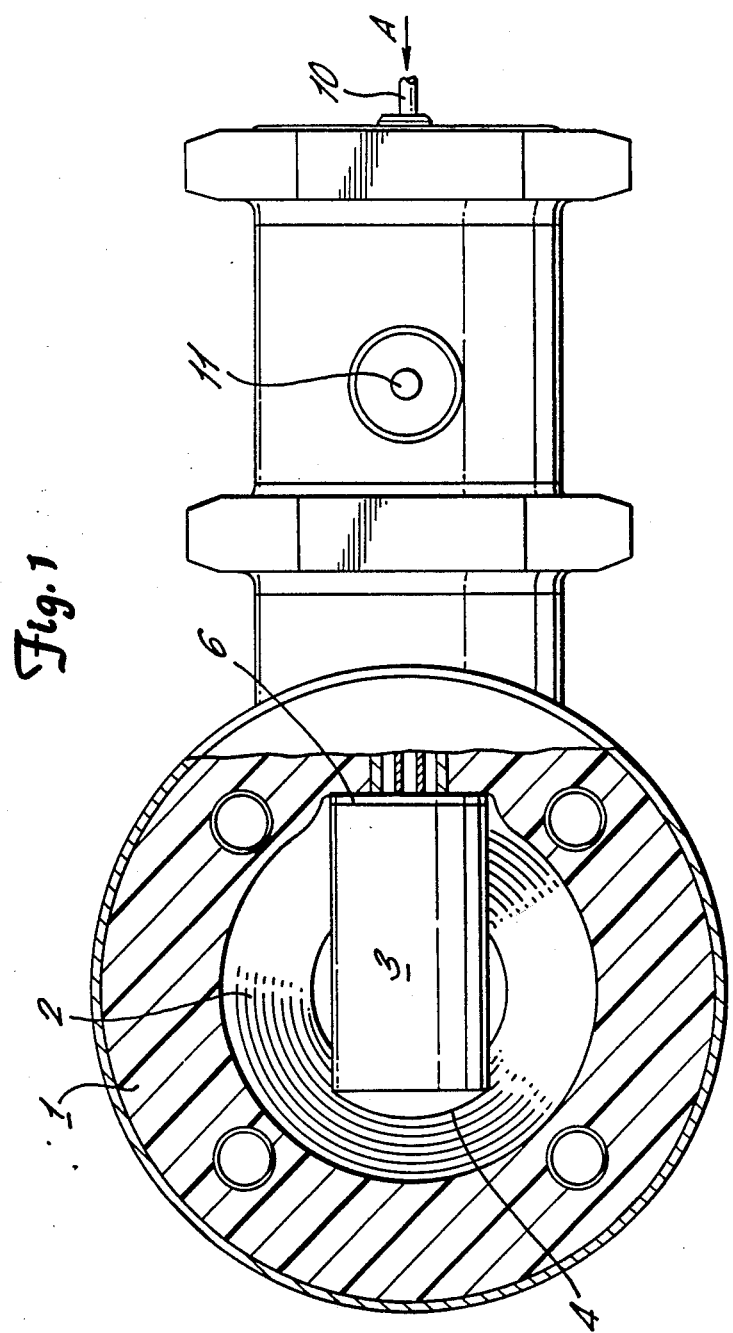
FIG. 1 is a top plan view of a heating electrode assembly for use in apparatus according to the invention.
Figure 2:
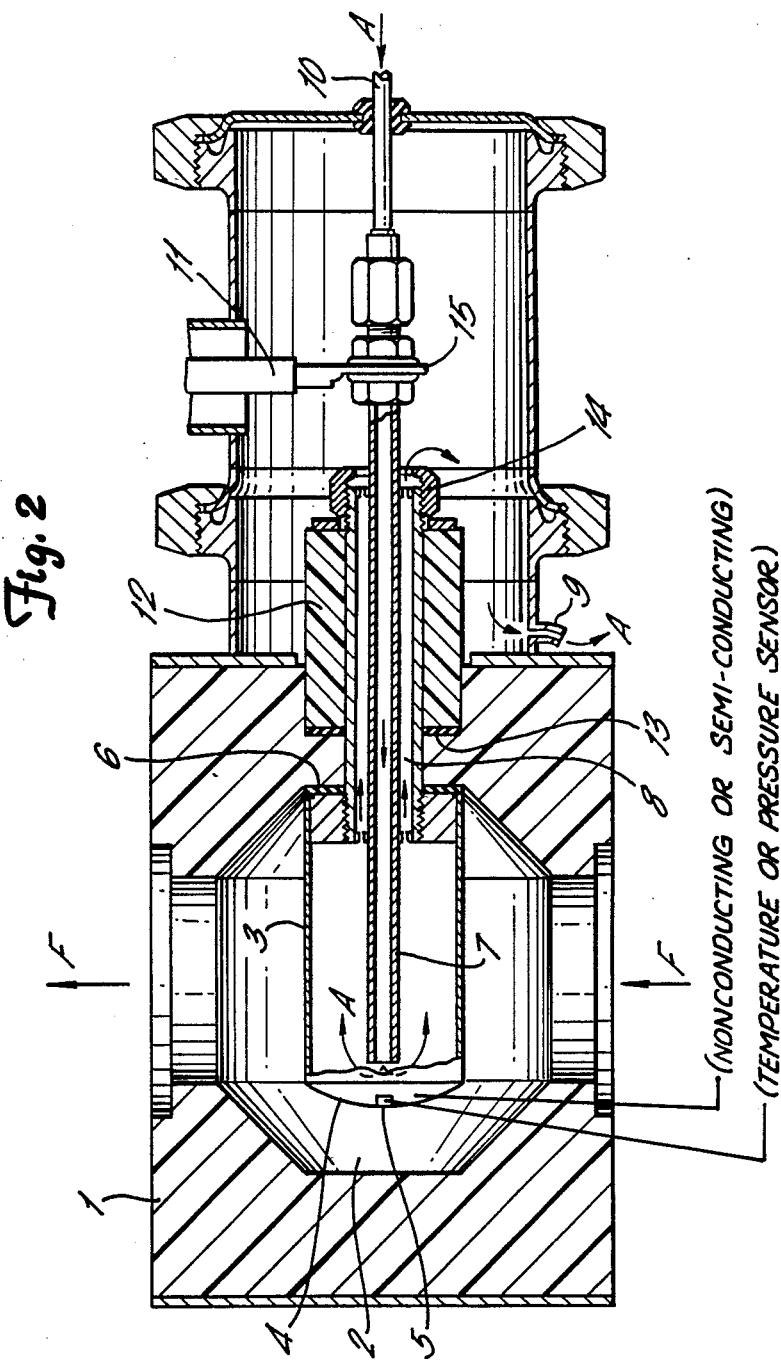
FIG. 2 is a sectioned side elevational view of the assembly of FIG. 1.

Referring to the drawings, the apparatus comprises a pipe section 1 of glass-filled PTFE for fitting to a pipe 16 through which a flowable electrically conductive medium to be heated flows, as indicated by the arrows F. As is clear from FIG. 2, the pipe section 1 has an increased cross-sectional medium flow passage 2 as compared with that of the pipe to which it is connected.

Projecting into the passage 2 in the pipe section 1 is a hollow cylindrical heating electrode 3 having its surface exposed to the medium which, in use, flows through the passage 2. The electrode 3 extends from the wall of the pipe section 1 in the manner of a cantilever beam, with its axis transverse to the direction of flow of the medium to be heated. The free end 4 of the electrode 3 is domed and carries a sensor 5 which is electrically isolated from the electrode 3 and which is used in measuring the pressure or temperature of the medium flowing in the passage 2. The electrode 3 is mounted on the wall of the pipe section 1 by means of a flat faced aseptic seal 6. Connections to the electrode 3 are made through the seal 6, these connections including a tubular conductor 7 through which cooling air is supplied to the interior of the electrode 3, as indicated by the arrows A in FIG. 2. The cooling air leaves the electrode 3 through a passage 8 outside the conductor 7 and leaves the apparatus through a vent 9. The cooling air is introduced through a plastics material pipe 10 from outside the apparatus. Electrical power is supplied to the electrode 3 by way of a cable 11 terminated by a terminal 15 secured to the conductor 7. The conductor 7 enters the pipe section 1 through a body 12 of insulating material having a gasket 13 at its inner end. The conductor 7 is clamped to the body 12 by means of a clamping nut 14.

Figure 4:
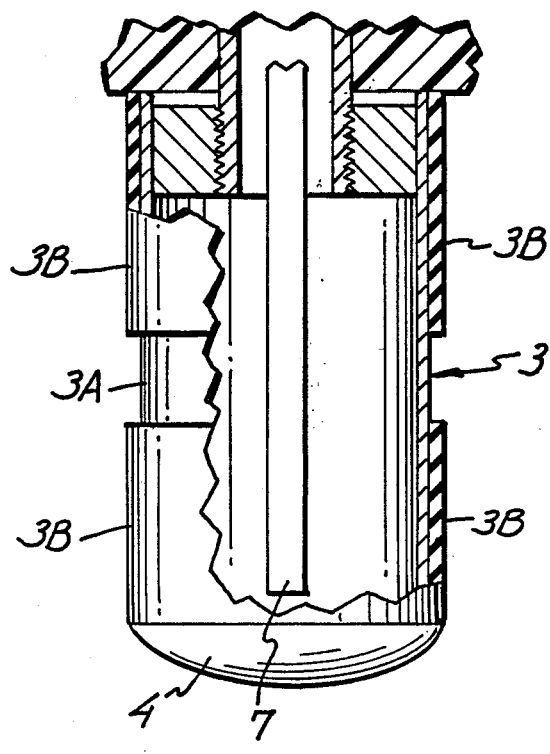
FIG. 4 is an enlarged sectional view of one wall of a typical electrode showing insulation coating thereon.

FIG. 4 illustrates that the electrode 3 may have a surface portion 3A to which the heating current is confined with the rest of the electrode coated with an electrical insulating material 3B. At least two of such assemblies arranged at spaced locations along a pipe 16 are required for an apparatus as discussed above.

Figure 3:
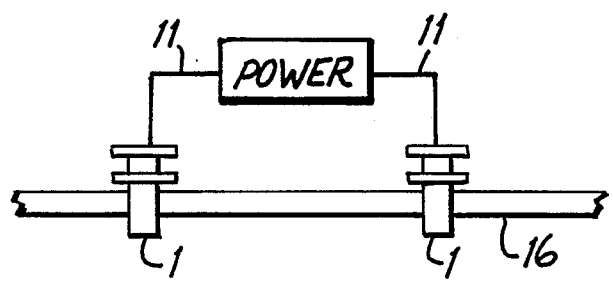
FIG. 3 is a fragmentary schematic view showing a pipe line having heating electrode assemblies made according to the present invention installed therein.

As is clear from the drawings and the above and as shown in FIG. 3 description the passage 2 through the pipe section 1 is substantially free of crevices or the like and gives smooth flow of the medium over the whole surface of the heating electrode 3. Further, sealing is required at only one end of the heating electrode 3 in view of its cantilever beam manner of mounting.

We claim:

1. Heating apparatus for heating an electrically conductive flowable medium, comprising a pipe through which, in use, a medium to be heated flows, the pipe having an electrical conductivity no greater than that of the medium; at least two heating electrodes arranged at spaced locations along the pipe and each having a surface exposed to the medium flowing in the pipe; and supply means for applying an alternating electrical supply across the heating electrodes such that an alternating current flows in the medium between the electrodes and heats the medium, in which apparatus each heating electrode is cylindrical and is arranged in the pipe with its axis transverse to the direction of flow of the medium in the pipe, and has only one end secured to the wall of the pipe whereby the heating electrode is supported by the wall of the pipe in the manner of a cantilever beam with its other end spaced from the inner surface of the pipe, electrical connection to each heating electrode being made through the wall of the pipe, and in which the connection of each heating electrode to the wall of the pipe is sealed with a flat faced aseptic seal formed between a flat end face of the cylindrical electrode and a cooperating flat face of the pipe wall.

2. Apparatus as claimed in claim 1, in which the free end of each heating electrode within the pipe is rounded.

3. Apparatus as claimed in claim 1 in which the whole heating electrode surface exposed to the medium in the pipe is plated with a noble metal.

4. Apparatus as claimed in claim 1, in which in that all but a particular surface portion of each heating electrode surface exposed to the medium in the pipe has a coating of electrically insulating material whereby the heating current flowing in the medium is confined to said particular surface portion of the heating electrode surface.

5. Apparatus as claimed in claim 1, in which each heating electrode has a free end portion made of electrically semi-conducting material.

6. Apparatus as claimed in claim 1, in which each heating electrode is hollow and means is provided to circulate a cooling fluid in the heating electrode to effect cooling thereof.

7. Apparatus as claimed in claim 1, in which a pressure transducer is mounted on at least one of said heating electrodes to measure the pressure in the medium being heated.

8. Apparatus as claimed in claim 1 in which a temperature sensor is mounted on at least one of said heating electrodes whereby the temperature of the medium being heated can be monitored.

9. Apparatus as claimed in claim 1 in which each heating electrode has a free end portion made of electrically non-conducting material.

* * * * *